(12) United States Patent
Agesen et al.

(10) Patent No.: US 7,117,481 B1
(45) Date of Patent: Oct. 3, 2006

(54) COMPOSITE LOCK FOR COMPUTER SYSTEMS WITH MULTIPLE DOMAINS

(75) Inventors: Ole Agesen, Needham, MA (US); Keith M. Adams, Mountain View, CA (US)

(73) Assignee: VMWare, Inc., Palo Alto, CA (US)

( * ) Notice: Subject to any disclaimer, the term of this patent is extended or adjusted under 35 U.S.C. 154(b) by 873 days.

(21) Appl. No.: 10/289,728

(22) Filed: Nov. 6, 2002

(51) Int. Cl.
*G06F 9/45* (2006.01)

(52) U.S. Cl. .................................................. 717/120
(58) Field of Classification Search ................. 717/120
See application file for complete search history.

(56) References Cited

U.S. PATENT DOCUMENTS

| | | | |
|---|---|---|---|
| 6,088,693 A * | 7/2000 | Van Huben et al. | 707/8 |
| 6,173,442 B1 | 1/2001 | Agesen et al. | |
| 6,314,563 B1 | 11/2001 | Agesen et al. | |
| 6,594,698 B1 * | 7/2003 | Chow et al. | 709/226 |

OTHER PUBLICATIONS

Hamilton, et al., "The Spring Nucleus: A Microkernel for Objects," Technical Report SMLI TR-93-14, Sun Microsystems Laboratories, Inc., Apr. 1993.

Agesen, et al., "An Efficient meta-lock for Implementing Ubiquitous Synchronization," Technical Report SMLI TR-99-76, Sun Microsystems, Laboratories, Inc., Apr. 1999.

Hubert, Bert, "futex"—undated Internet-published web page http://ds9a.nl/futex-manpages/futex4.html.

* cited by examiner

*Primary Examiner*—John Chavis
(74) *Attorney, Agent, or Firm*—Jeffrey Pearce

(57) ABSTRACT

In a multi-domain computer system in which several processes are running, a composite lock provides mutually exclusive access to a resource. The composite lock has a back-end component and a front-end component. The back-end component is platform-dependent and operates as a semaphore, with Wait and Signal functions. The front-end component conditionally calls the Wait and Signal functions depending on whether the lock is currently contested when a new process wishes to acquire the lock, and on whether any process is currently suspended, waiting to acquire the lock. The front-end and back-end components may execute in different domains. In the uncontested case, the invention avoids costly domain crossings. The front-end component may also include a spinning feature to further reduce the need to invoke the back-end component and cause a domain crossing. The composite lock is particularly advantageous in computer systems that include a virtual machine.

40 Claims, 2 Drawing Sheets

COMPOSITE LOCK FOR COMPUTER SYSTEMS WITH MULTIPLE DOMAINS

BACKGROUND OF THE INVENTION

1. Field of the Invention

This invention relates to the coordination of concurrently running processes in a computer.

2. Description of the Related Art

Most personal computer systems are equipped with a single processing unit (CPU). Because CPUs today are quite fast, a single CPU often provides enough computational power to handle several "concurrent" tasks by rapidly switching from task to task (a process sometimes known as time-slicing or multiprogramming). This management of concurrent tasks is one of the main responsibilities of almost all operating systems.

Two main concepts in concurrent programming are "processes" and "resources." A process is a sequence of executable code with its own thread of control. Concurrent programs are distinguished from sequential programs in that they permit multiple, simultaneous processes. Processes may share resources; examples of sharable resources include software resources such as data structures and hardware resources such as the CPU, memory and I/O devices.

Assume by way of example the common case in which the sharable resource is the (or one of the) CPU(s). The use of multiple concurrent tasks often allows an overall increase in the utilization of the CPU resource. The reason is that while one task is waiting for input or output to happen, the CPU may execute other "ready" tasks. As the number of tasks increases, however, the point may be reached where computational cycles, that is, CPU power, is the limiting factor. The exact point where this happens depends on the particular workloads; some workloads carry a high computation-to-I/O ratio whereas others have the inverse ratio.

To permit computer systems to scale to larger numbers of concurrent tasks, systems with multiple CPUs have been developed. Essentially, a multiprocessor system is a hardware platform that connects multiple processors to a shared main memory and shared I/O devices. In addition, each processor may have private memory. The operating system, which is aware of the multiple processors, allows truly concurrent execution of multiple tasks, using time-slicing only when the number of ready tasks exceeds the number of CPUs.

See FIG. 1. Modern computer systems have system hardware 100 that includes one or more processing units (CPUs) 102, a memory management unit (MMU) 108 for each CPU, a quantity of memory 104, and one or more disks 106. Devices 110 such as network interfaces, printers, etc., are also included in or are connected to the system hardware. As is well understood in the field of computer engineering, the system hardware also includes, or is connected to, conventional registers, interrupt-handling circuitry, a clock, etc., which, for the sake of simplicity, are not shown in the figure.

Software is also part of a computer system. Typically, software applications 260 provide the ultimate utility of the computer system, allowing users to publish web pages, simulate complicated physical scenarios, or any number of other computational tasks. Users often want to use more than one of these software applications 260, perhaps concurrently. To make this possible, applications are typically written to run on top of a piece of software, often known as the "operating system" 220, which is the main component of system software 200. The operating system uses a more privileged mode of the CPU, so that it can perform operations that applications cannot. Any use of CPUs, MMUs, or I/O devices that a software application requires must therefore be mediated by the operating system to prevent errors in the application software from damaging the system as a whole. Drivers 240 are also typically loaded into the operating system as needed to enable communication with devices.

Because of the operating system's central place in the system software, it can be leveraged for other technical benefits. Both users and developers want software applications to run on heterogeneous hardware. To enable this, the operating system exports abstractions of the system's hardware, rather than direct representations of them, and the OS maintains mappings from these abstractions to hardware resources. For example, the OS exports a single, unified file system abstraction regardless of the storage hardware present in the system.

Almost all modern operating systems export some notion of "task", or "process," which has a "thread" of control or execution. This is an abstraction of a CPU and its MMU. A task is conceptually similar to an execution vehicle, and usually corresponds to a single activity that requires computational resources (memory, CPU, and I/O devices) to make forward progress. The operating system multiplexes these tasks onto the physical resources of the system. At any time, the operating system can force a task to give up use of the resource in order to allow its use by another task (perhaps one that has not had access to the resource for some time, or one that the user has given a higher priority to).

Any system with concurrent tasks will share some data among those tasks. Care must then be taken when modifying such shared data to preserve correct program semantics. Consider for example a shared variable that represents the balance of a bank account, with two concurrent tasks that are accessing the balance. Task 1 wishes to perform a withdrawal, while Task 2 is performing a deposit. Assume further that the program is executing on an abstracted, "typical" computer, for which the assembly language program to withdraw an amount W is:

load balance
sub W
store balance

The similar program to deposit an amount D is:

load balance
add D
store balance

A serious problem may arise, however, if both tasks 1 and 2 execute these programs concurrently: Suppose the balance starts at 1000; Task 1 is depositing 100 dollars, while Task 2 is withdrawing 100 dollars. The following interleaving of instructions is then possible:

| Task 1 | Task 2 | Result |
|---|---|---|
| load balance | load balance | Both tasks see a balance of $1000 |
| add 100 | | Task 1: 1100 |
| | sub 100 | Task 2: 900 |
| store balance | store balance | Race! |

Depending on the order in which the final "store" instructions execute, either 900 or 1100 will be stored as the final balance. The balance will therefore be off by $100 in favor of either the customer or the bank. This program "races," since, as in a foot race, one cannot know what the result will be until the race is run.

As yet another example of a problem of concurrency, consider a computer with two CPUs, which need to be prevented from interfering with each other's operations on some data structure, disk space, memory region, etc. For example, one of the CPUs cannot be allowed to change the linkings of a doubly linked list while the other CPU is traversing the list.

The system must therefore provide a way for concurrent tasks to "synchronize." In other words, some mechanism must be provided to control concurrency, in order to prevent interleavings of instructions, such as the example above, that can lead to unpredictable, ambiguous or contradictory results.

The question then arises as to what sort of control over concurrency applications need to maintain correct program semantics. One possible solution would be to allow applications complete control over system concurrency; for example, the operating system could allow tasks to demand exclusive use of the system for unlimited periods of time. In the bank account example above, this approach might mean that Task 1 (or Task 2) would run exclusively on the system, to completion, whether this execution involves just the deposit (or withdrawal) of money or some longer sequence of actions. This would certainly be sufficient to correct problems like the bank balance example above, but the cost would in most cases be too great: By ceding too much control to applications, a faulty or malicious application would be able to monopolize the system and prevent other tasks from running. Moreover, this would not even allow one to take advantage of the capabilities of a true multi-processor system.

The set of synchronization primitives available to tasks must therefore be chosen and designed judiciously: The primitives must be flexible enough to meet the needs of application writers, while still maintaining the primacy of the operating system in making decisions about resource usage. Over the years, many sets of primitives have been proposed, and the relations between the different primitives have been demonstrated, such as implementation of one primitive using one or more of the other primitives.

With "mutual exclusion," the system ensures that a "critical section" of code is executed by at most one task at any given time. Access to a critical section is a "resource." The term "resource" as used below is consequently to be interpreted as including access to a critical section. In the example above, the "deposit" and "withdraw" subprograms would have the following critical sections:

For deposit:
load balance
add 100
store balance
For withdrawal:
load balance
sub 100
store balance This is because interleaving of these deposit and withdrawal instructions could cause ambiguous results. The "load balance" instruction is also part of each subprograms' critical section because, otherwise, the balance value loaded by other subprograms could be "stale." Before a task can be allowed to enter its critical section, it must therefore wait for any task currently in its critical section to exit it. When exiting its critical section, a task will allow one waiting task to enter its respective critical section (if there are any tasks waiting to enter it). Thus, there is always at most one task in the critical section.

In general, a "lock" is a data structure that has an interface with two principal operations, namely, LOCK, in which a task acquires the lock and is given access to its critical section, and UNLOCK. Depending on which lock is implemented, there are different ways to force a task to wait before entering its critical section. One property of a lock is that two consecutive LOCK operations (with no intervening UNLOCK operation) cannot be allowed to succeed. Stated differently, two different tasks, processes, etc., cannot be allowed to hold the same lock at the same time. Providing this semantic usually involves either some hardware support, or a more basic lock, or both. Different kinds of locks are in common use.

So-called "spin locks" simply continually check for the availability of access to the critical section by executing a tight loop. These locks have the advantage that uncontested locks are acquired very quickly, in time comparable to that needed for a single memory access. Moreover, spin locks do not generally require the usually very costly involvement of a scheduler (such as scheduler 250 in FIG. 1). Spin locks have the disadvantage, however, that waiting tasks use CPU time (executing their loops) that could be used to do useful work.

To avoid this disadvantage, operating systems often provide "blocking locks." Acquiring such a lock requires that the task call into the operating system; the operating system (in particular, the scheduler) can then "block" the task, and use the CPU to accomplish other useful work until the lock's current owner leaves its critical section. Blocking locks present the opposite set of trade-offs to those of spin locks: They have the advantage of not wasting CPU time while waiting for long-held locks, but they have the disadvantage that acquiring even an uncontested lock is costly. (Entry into the operating system is much more costly than simply accessing memory.)

Researchers and engineers have sought to combine the advantages of spin locks (low latency to acquire while uncontested) and blocking locks (sparing the CPU while contested) using so-called "adaptive" locks, which operate in part as each kind of lock. When attempting to acquire such an adaptive lock, a thread will spin on the lock for a while, hoping to find it uncontested. As with pure spin locks, past a certain point, spinning wastes CPU time. To offset this disadvantage, if the thread spins too long while trying to acquire the adaptive lock, then the system accepts the cost of invoking the OS scheduler and blocks on the lock.

Conventional adaptive locks have disadvantages of their own, however. Adaptive locks are, for example, typically more complicated to implement and analyze than pure spin locks or pure blocking locks. If a system designer knows beforehand that a lock will only ever be held for a short time, then a spin lock will be simpler to implement and use fewer resources than an adaptive lock. Conversely, if a lock will always be held for long periods of time, then a blocking lock will usually be preferable to a adaptive lock. An adaptive lock is therefore often preferred when a given lock might be held for highly variable periods of time, or when it is impossible for the system designer to predict how long a given lock might be held.

A good explanation of the terminology and concepts used to control concurrency by providing mutual exclusion is found in M. Ben-Ari, "Principles of Concurrent and Distributed Programming," Prentice Hall, 1990 (below: "Ben- Ari"). Ben-Ari also explains the properties that a lock algorithm must have for it to guarantee correct control of concurrent processes:

1) Mutual exclusion—Given two or more concurrent processes, whose critical instructions (those in critical sections) are not interleaved and none of which halts execution when in its critical section, only one may be allowed to execute in its critical section at any time.

2) No deadlocking—If two or more processes are contending to enter their respective critical sections, then one of them will eventually succeed.

3) No starvation—If a process indicates that it wishes to enter its critical section, then it will eventually succeed.

4) Success in absence of contention—If there is no contention, then a single process that wishes to enter its critical section will be allowed to do so.

In other words, processes should have exclusive access to the resource; if multiple processes request the resource, then one of them must be allowed to access it in a finite time; a process that has exclusive access to the shared resource must release it in a finite time; and all requesting processes must be allowed to obtain the resource in a finite time.

For reasons of privilege or convenience, a computer system's software environment is often viewed as being partitioned into a group of "domains," where a domain is a predetermined set of operations. Examples of "operations" include the P and V functions of semaphores (see below), reading from a file, etc. Although a thread may change domains, it may perform the operations associated with only one domain at a time. When a thread needs to access the capabilities of another domain, it must incur the cost of transitioning from its current software domain to the destination domain. Such transitions are referred to here as "domain crossings." These transition costs typically represent the CPU cost associated with the thread leaving its current domain and entering its destination domain. For example, depending on the transition, a domain switch might require flushing various hardware caches, storing assorted state information, etc.

As just one example, consider a modern operating system implementation. Such a system can be analyzed into two "domains," namely, the "user" domain, and the "kernel" (or "system") domain. Other divisions may be made instead, or in addition to, the "user" and "kernel" domain division used in this example; indeed, the invention is described below in the context of a different domain division, namely, between host and virtualized domains.

A thread in the user domain is allowed to modify (read and write) memory in its own address space. The kernel can also modify memory in the user domain address space, and has two other capabilities: It is also allowed to modify memory in the global kernel address space, and to access physical I/O devices. In some systems, the capabilities of the two domains overlap, but this is not necessary according to the invention.

Now imagine a thread executing in the user domain. As long as this thread does nothing but compute (the right to compute is an implicit "capability," because, otherwise, a given domain is useless) and modify its own address space, the thread can stay in the user domain. When it wants to access data on a hard drive, however, it must incur the cost of switching to the kernel domain.

Not all operating systems are structured as only two domains. During the 1990's, an alternative operating system structure, referred to as a "microkernel," emerged as a practical alternative. In microkernel-based systems, almost all of the operating system runs as user-level programs, which make available the services of a typical operating system to other programs. For example, the file-system, device drivers, and networking might each run as service processes. A very small, simple kernel exists, but only to schedule processes and to provide for communication among them. The name "microkernel" derives from the distinctively small kernel at the center of such an operating system design.

In the Spring research microkernel, the kernel provides the abstractions of threads, processes, and remote procedure calls (RPCs). All other abstractions are provided by user-level "server" processes. For example, a file-system server makes the set of file operations available. The file-system server in turn uses the services of a disk device server, which provides operations on a disk drive. For further details, see the technical report "The Spring Nucleus: A Microkernel for Objects," Graham Hamilton and Panos Kougiouris, SMLI TR-93-14, Sun Microsystems Laboratories, Inc., April 1993.

In Spring, a thread performing an RPC to a remote server logically becomes part of the server process until the completion of the RPC. This corresponds well to the concept of domains as used in this description of the present invention: Each Spring process can be thought of as a domain, and the services it provides enumerates the set of operations available in this domain. The cost of a domain switch is the cost of executing the Spring microkernel's code for moving a thread to another process.

Microsoft Corporation's ".Net Common Language Runtime" ("CLR") provides an abstraction called "Application Domains." The use of the term "domain" in the CLR context is a special and more specific case of the definition used in the context of the present invention. In the CLR, an "application domain" is a unit of encapsulation within a process, that is, a process contains one or more "application domains." A thread running in one application domain cannot directly access objects in another; however, the CLR provides a remote procedure call mechanism that allows code running in one domain to access objects from other domains. Thus, "application domains" are also "domains" in the sense defined above. Each domain's set of operations is determined by the set of .Net objects that reside in the corresponding application domain. The cost of a domain switch is the cost of invoking the CLR's remote procedure call facility.

Applications themselves can often be further subdivided into smaller, application-specific domains. For example, a UNIX process might use the set[eg]uid family of system calls to change its privilege. One can regard this privilege adjustment operation as a domain crossing. As another example, a Java virtual machine (JVM) might use dynamically generated code to execute simple ALU operations, but has to run on a separate hardware stack to access operating system facilities. A Java virtual machine running typical Java code often needs millions of LOCK and UNLOCK synchronization operations per second. If a non-adaptive blocking lock is used, and the scheduler is not part of the JVM (that is, it is in the OS domain), then a large number of crossings will be required between the JVM and OS domains, since the blocking lock is in the same domain as the scheduler.

Yet another example of a computer system that operates with multiple domains is a system that includes a type of "virtual machine" (VM), also known as a "virtual computer," which is a software abstraction of an entire computer system. Note that the concept of a virtual machine differs in this case from that used in Java systems. FIG. 1 also illustrates the main components of a system that supports a VM as implemented in the Workstation product of VMware, Inc. This system is described in detail below.

Multiple tasks running concurrently in different domains present special challenges to designers of locks, adaptive or otherwise. If access to a lock is limited to a subset of the domains in the system, for example, then locking in other domains might be prohibitively costly, due to domain switches.

What is needed is therefore a lock that is suitable for coordinating access by two or more concurrently running processes to a resource in a multi-domain environment such that the lock is compact, simple and efficient, even where domain-switching is costly. The lock should meet Ben-Ari's correctness requirements. This invention provides such a lock.

SUMMARY OF THE INVENTION

The invention provides a lock for use in a computer system that has a hardware platform, a software platform and a plurality of processes (or, equivalently, threads or tasks) executing in user-defined domains. The lock according to the invention has two main components: a platform-dependent lock component that operates as a semaphore, with a wait function and a signal function; and a front-end lock component, which is accessible from a different domain than the platform-dependent lock component. The front-end lock component may be implemented entirely in software, with no need for specialized hardware support.

For acquiring the lock, the front-end component performs a first operation on a variable, which indicates how many of the processes currently hold or wish to acquire the lock. The front-end component does this by atomically changing the variable by a first predetermined amount; and by calling the wait function of the platform-dependent lock component if the variable meets a first comparison condition relative to a predetermined first threshold value.

For releasing the lock, the front-end component performs a second operation on the variable by atomically changing the variable by a second predetermined amount; and by calling the signal function of the platform-dependent lock component if the variable meets a second comparison condition relative to a predetermined second threshold value.

The processes call the front-end lock component in order to acquire the lock regardless of the domain in which they are currently executing. Only one of the processes at a time is allowed to acquire the lock.

The first operation is preferably an atomic increment operation, such as "fetch-and-increment." The second operation is preferably an atomic decrement operation, such as "fetch-and-decrement."

In the preferred embodiment of the invention, the first comparison condition is that the variable indicates that at least one of the processes currently holds or wishes to acquire the lock and the second comparison condition is that the variable indicates that at least one of the processes wishes to acquire the lock in addition to the process that currently holds the lock.

In a spin-enhanced embodiment of the invention, the front-end lock component comprises further computer instructions for testing, when a calling process requests the lock and for a finite number of iterations, whether any process currently holds the lock. If no process currently holds the lock, then the front-end lock component gives the lock to the calling process. If some process does currently hold the lock, then, at the end of the finite number of iterations, the front-end lock component proceeds to atomically change the variable and call the wait function.

In the preferred embodiment of the invention, the lock is interposed between the processes and a resource for providing exclusive access to the resource to whichever process holds the lock. The lock itself may be the resource to which access is controlled.

The composite lock according to the invention is particularly advantageous in computer systems that include at least one virtual machine (VM) and a virtual machine monitor that forms a software interface between the VM and an underlying host hardware platform. The plurality of user-defined domains then includes a host domain and a VM domain. The front-end component of the composite lock, which is accessible to processes running in both the host domain and the VM domain, conditionally calls the platform-provided lock component in the case of contention for the composite lock.

DETAILED DESCRIPTION

Figure 1:
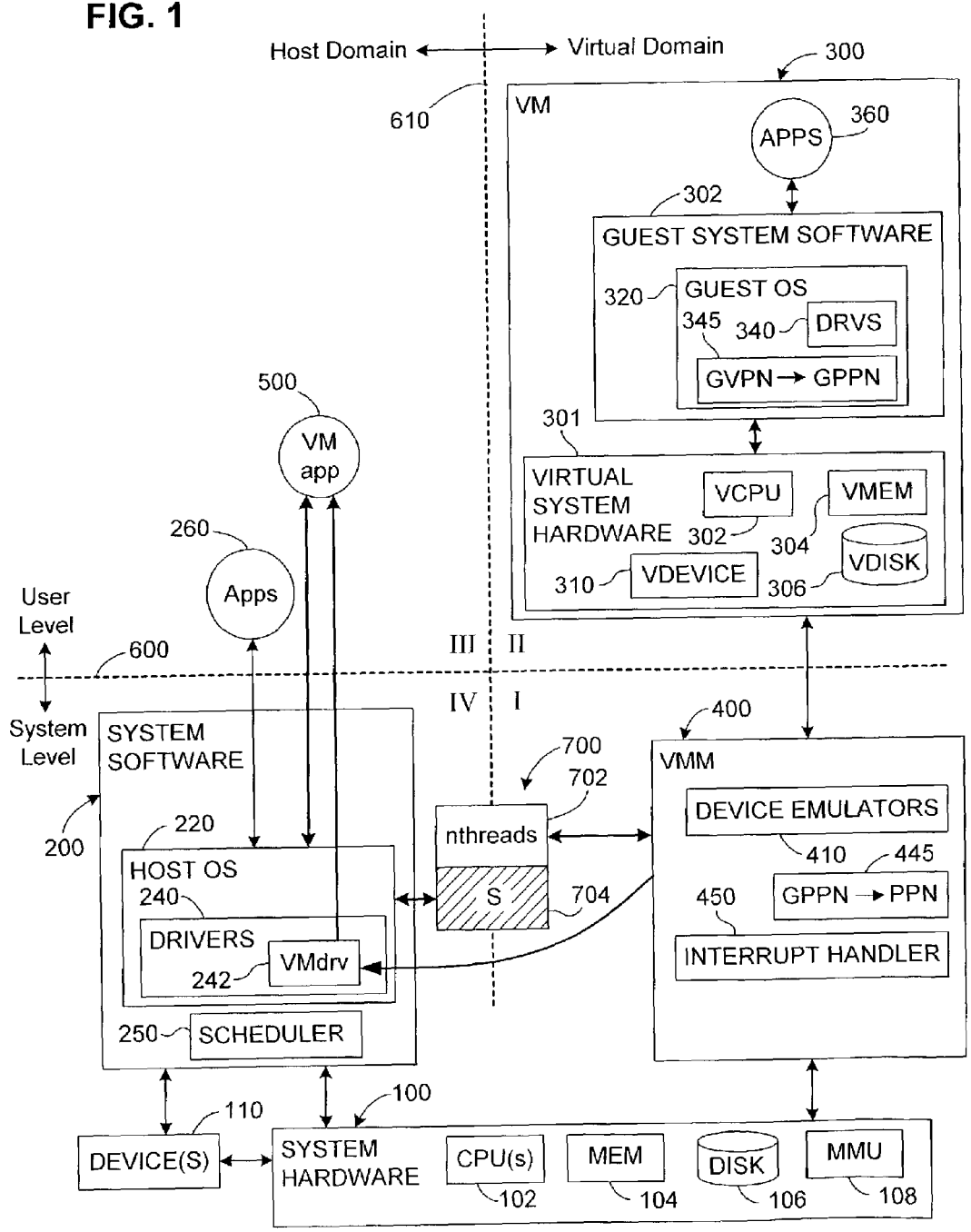
FIG. 1 illustrates the main hardware and software components of the preferred embodiment of the invention, in which a virtualized computer system is running on a host platform and in which processes in the virtual domain contend with those in the host domain.

In a system in which concurrent threads require mutually exclusive access to a resource, the invention provides a domain-crossing, composite lock with a platform-independent lock component and a conventional, platform-dependent lock component. The only assumption concerning the platform-dependent lock component is that it operates as a semaphore, such as is provided by all common OSs.

The invention is particularly advantageous where the concurrent threads run in different domains, although this is not required by the invention. The two lock components also operate across the different domains. In cases where the lock according to the invention is uncontested, proper, mutually exclusive concurrency can be provided by the composite lock without performing any domain crossings. In the remaining cases, when there is a need to transition between lock components, and thus domains, the invention detects this need rapidly, although the overall cost will often be dominated by the domain crossing cost.

The invention may be used to control access to any form of shared resource, such as a software object, a hardware device, or even a virtual device. Regardless of whether the shared resource is hardware or software, access will still usually involve execution of some block of instructions; consequently, as mentioned above, a critical section of code is also a resource, access to which must be exclusive to one thread at a time.

Moreover, it is not necessary according to the invention for the resource to be an entity separate from the lock. In other words, the lock itself may be the resource that threads wish to acquire. This technique could be used, for example, for diagnostic purposes such as error checking.

In this discussion of the invention, the terms "thread," "process," and "task" are used interchangeably merely for the sake of simplicity—the differences between them are irrelevant to the understanding or operation of the invention. Skilled computer scientists will readily understand the equivalence of these terms in the context of this invention. Moreover, if domain D is the only domain that includes operations that can operate on a software object (such as a synchronization object, file, etc.), then this is expressed herein by writing that the object is "in" or "belongs to" domain D; this is also done for the sake of simplicity.

Before attempting to understand the details of the composite lock according to the invention, it is helpful to review three important concepts, namely, semaphores, domains and virtual machines.

Semaphores

In "The Structure of the THE-Multiprogramming System, "*Communications of the ACM*, 1968, pp. 341–346; and "Co-operating sequential processes," in F. Genuys (ed.) "*Programming Languages*," Academic Press, New York, 1968, pp. 43–110, among other papers, the famous computer scientist Edsger W. Dijkstra developed the concept of a "semaphore." Dijkstra defined a semaphore generally as a variable that processes share but that can be manipulated only by one of two operations P and V, which abbreviate the Dutch terms "Proberen" (to test) and "Verhogen" (to increment). Both P and V take the non-negative "semaphore" S as an argument. The P(S)N(S) operations are also commonly referred to as Wait(S)/Signal(S) or Down(S)/Up(S), the latter of which most closely brings to mind the idea of a semaphore as a flag that is raised and lowered to signal whether a train can safely proceed.

Because "Wait" and "Signal" are also used as function names in the context of other known synchronization objects, they are prefixed here with "sema_" to indicate that they are the Wait and Signal operations associated with a semaphore. The sema_Wait(S) and sema_Signal(S) operations are generally defined as follows:

sema_Wait(S)
  if (S>0) then
    S=S−1
  else
    suspend execution of the calling process (the process is suspended "on S")
  endif sema_Signal(S)
  if (at least one process is suspended on S) then
    unblock ("wake") one suspended process
  else
    S=S+1
  endif In order to avoid race conditions, both sema_Wait(S) and sema_Signal(S) must be atomic. If one or more processes are suspended on the semaphore S, then sema_Signal(S) causes one of them to be "released" or "unblocked" to continue execution in its critical section. If a new process makes a call to sema_Wait(S) before the newly unblocked process starts running again, the new process is blocked. Thus, an unblocked process has priority over newly arriving processes.

The semaphore S may be initialized to any non-negative integer value, usually unity. In general, the semaphore S indicates the number of units of the resource that are free. If the resource is unitary, including the case where the resource is the mechanism that allows a process to enter and execute a critical code section, then it is advantageous to initialize S=1 and to let unity be the maximum, "saturated" value assumed by the counter S. No further state change will then result from additional Signal calls. The semaphore then becomes "binary," taking only the values 0 or 1. The pseudocode for sema_Wait(S) and sema_Signal(S) above can then be reduced to the following:

sema_Wait(S)
  If (S=1) (or simply: "If S", if S is defined as a logical variable) then
    S=O
  else
    suspend execution of the calling process
  endif sema_Signal(S)
  If (at least one process is suspended on S) then
    wake one suspended process
  else
    S=1
  endif Whether at least one process is suspended on S is determined using conventional mechanisms, such as with a binary flag, or a counter that increments as processes are suspended and decrements as processes are awakened. The operating system (or some other software entity) may decide which suspended process is to be unblocked in any of many known ways, for example, by using a simple FIFO queue. If other selection algorithms are used, care should be taken to ensure that no process is starved. Note that when a suspended process is awakened, it does not need to issue the pre-protocol sema_Wait(S) call again but rather can proceed directly to enter its critical section.

The semaphore "flag" S is therefore initially "up" (=1). Depending on the manner in which the semaphore is used (it is a general purpose synchronization primitive that can be used for diverse ends), this state may indicate that a process is free to enter its critical section. Before entering, however, the admitted process "lowers" the flag. As long as the flag is lowered, all other processes that want to enter their critical sections are suspended. When the currently admitted process is finished with its critical section, it hands access to another, currently suspended process. If no other process is suspended, then the currently admitted process "raises" the semaphore flag again and the semaphore returns to its initial state.

Calls to the sema_Wait(S) and sema_Signal(S) operations are typically inserted as pre- and post-protocol calls, that is, so as to "bracket" the critical code sections of each concurrent process. Thus:
  sema_Wait(S)
  critical section
  sema_Signal(S)

Many variations on Dijkstra's semaphore primitives P(S) and V(S) have been developed and are in wide use, so much so that all common OSs now provide semaphores or some other implementation of the function of a semaphore using some combination of other known synchronization primitives. Note that a data type is generally defined by its operation, so if it operates as a semaphore, then it is a semaphore. All such mechanisms may be used as the "black-box" back-end lock component described below.

Domains

The definition of "domain" is given above. There are some points that are worth keeping in mind, however. First, the separation of domains is related to the notion of the cost to switch from one domain to the other. What constitutes a cost sufficient to justify defining a new domain will depend on the preferences of the system designer, who may determine this cost in any manner, such as through experimentation, calculation, heuristically, or even arbitrarily. Second, the invention does not require or even assume a permanent association between a thread and a domain; in other words, the invention does not limit the ability of a thread to move from one domain to another.

In short, the system designer may choose to divide a given computer system into different domains in many different ways. The choice of domain analysis will reflect the performance issues the designer is interested in. The invention may be used with any choice of domain analysis. Although the division of a system into domains is thus at least a partially arbitrary conceptual exercise, once the designer chooses a division he may unambiguously implement the lock according to the invention according to the choice.

Virtualized Computer Systems

As is mentioned above, in the preferred embodiment of the invention, the concurrent processes in the system that are controlled with the composite lock according to the invention are those relating to a virtual machine (VM) and those relating to the host platform (in particular, the host system software and applications running on it).

FIG. 1 illustrates the main hardware and software components of such a system. As in conventional computer systems, both system hardware 100 and system software 200 are included. The usual main components of the system hardware 100 and system software 200 are mentioned above and are therefore not repeated here.

As is well known, the virtual machine (VM) 300—also known as a "virtual computer"—is a software implementation of a complete computer system. In the VM, the physical system components of a "real" computer are emulated in software, that is, they are virtualized. Thus, the VM 300 will typically include virtualized ("guest") system hardware 301, which in turn includes one or more virtual CPUs 302 (VCPU), virtual system memory 304 (VMEM), one or more virtual disks 306 (VDISK), and one or more virtual devices 310 (VDEVICE), all of which are implemented in software to emulate the corresponding components of an actual computer.

The VM's (guest) system software 302 includes a guest operating system 320, which may, but need not, simply be a copy of a conventional, commodity OS, as well as drivers 340 (DRVS) as needed, for example, to control the virtual device(s) 310. Of course, most computers are intended to run various applications, and a VM is usually no exception. Consequently, by way of example, FIG. 1 illustrates one or more applications 360 installed to run on the guest OS 320; any number of applications, including none at all, may be loaded for running on the guest OS, limited only by the requirements of the VM.

Note that although the hardware "layer" 301 will be a software abstraction of physical components, the VM's system software 302 may be the same as would be loaded into a hardware computer. The modifier "guest" is used here to indicate that the VM, although it acts as a "real" computer from the perspective of a user, is actually just computer code that is executed on the underlying "host" hardware and software platform 100, 200. Thus, for example, I/O to the virtual device 310 will actually be carried out by I/O to the hardware device 110, but in a manner transparent to the VM.

If the VM is properly designed, then the applications (or the user of the applications) will not "know" that they are not running directly on "real" hardware. Of course, all of the applications and the components of the VM are instructions and data stored in memory, just as any other software. The concept, design and operation of virtual machines are well known in the field of computer science. FIG. 1 illustrates a single VM 300 merely for the sake of simplicity; in many installations, there will be more than one VM installed to run on the common hardware platform; all will have essentially the same general structure, although the individual components need not be identical.

Some interface is usually required between the VM 300 and the underlying "host" hardware 100, which is responsible for actually executing VM-related instructions and transferring data to and from the actual, physical memory 104. One advantageous interface between the VM and the underlying host system is often referred to as a virtual machine monitor (VMM), also known as a virtual machine "manager" and occasionally, albeit somewhat inaccurately, as a "hypervisor." Virtual machine monitors have a long history, dating back to mainframe computer systems in the 1960s. See, for example, Robert P. Goldberg, "Survey of Virtual Machine Research," Vol. 7, No. 6, 1974.

A VMM is usually a relatively thin layer of software that runs directly on top of a host, such as the system software 200, or directly on the hardware, and virtualizes the resources of the (or some) hardware platform. The VMM will typically include at least one device emulator 410, which may also form the implementation of the virtual device 310. The interface exported to the respective VM is usually such that the guest OS 320 cannot determine the presence of the VMM. The VMM also usually tracks and either forwards (to the host OS 220) or itself schedules and handles all requests by its VM for machine resources, as well as various faults and interrupts. FIG. 1 therefore illustrates an interrupt (including fault) handler 450 within the VMM. The general features of VMMs are well known and are therefore not discussed in further detail here.

In FIG. 1, a single VMM 400 is shown acting as the interface for the single VM 300. It would also be possible to include the VMM as part of its respective VM, that is, in each virtual system. Although the VMM is usually completely transparent to the VM, the VM and VMM may thus be viewed as a single module that virtualizes a computer system. The VM and VMM are shown as separate software entities for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VM/VMM configurations.

In some configurations, the VMM 400 runs as a software layer between the host system software 200 and the VM 300. In other configurations, such as the one illustrated in FIG. 1, the VMM runs directly on the hardware platform 100 at the same system level as the host OS. In such case, the VMM may use the host OS to perform certain functions, including I/O, by calling (usually through a host API—application program interface) the host drivers 240. In this situation, it is still possible to view the VMM as an additional software layer inserted between the hardware 100 and the guest OS 320. Furthermore, it may in some cases be beneficial to deploy VMMs on top of a thin software layer, a "kernel," constructed specifically for this purpose.

In such an implementation, the dedicated kernel takes the place of and performs the conventional functions of the host OS. Compared with a system in which VMMs run directly on the hardware platform, use of a kernel offers greater modularity and facilitates provision of services that extend across multiple virtual machines (for example, resource management). Compared with the hosted deployment, a kernel may offer greater performance because it can be co-developed with the VMM and be optimized for the characteristics of a workload consisting of VMMs.

As used herein, the "host" OS therefore means either the native OS 220 of the underlying physical computer, or whatever system-level software handles actual I/O operations, etc. for the VM. The invention may be used in all the different configurations described above.

As in most modern computers, the address space of the memory 104 is partitioned into pages (for example, in the Intel x86 architecture) or regions (for example, Intel IA-64 architecture). Applications then address the memory 104 using virtual addresses (VAs), which include virtual page numbers (VPNs). The host OS then maps the VAs to physical addresses (PAs), usually by mapping VPNs to physical page numbers (PPNs) that are used to address the physical memory 104. (VAs and PAs have a common offset from a base address, so that only the VPN needs to be converted into a corresponding PPN.) The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579–603 (chapter 7.4 "Virtual Memory").

An extra level of addressing indirection is typically implemented in virtualized systems in that a VPN issued by an application 360 in the VM 300 is remapped twice in order to determine which page of the hardware memory is intended. The first mapping is provided by a mapping module 345 within the guest OS 302, which translates the guest VPN (GVPN) into a corresponding guest PPN (GPPN) in the conventional manner. The guest OS therefore "believes" that it is directly addressing the actual hardware memory, but in fact it is not.

Of course, a valid address to the actual hardware memory address must ultimately be generated. An address mapping module 445 in the VMM 400 therefore performs the second mapping by taking the GPPN issued by the guest OS 302 and mapping it to a hardware page number PPN that can be used to address the hardware memory; this GPPN-to-PPN mapping may also be done in the host OS, depending on the implementation: From the perspective of the guest OS, the GVPN and GPPN might be virtual and physical page numbers just as they would be if the guest OS were the only OS in the system. From the perspective of the actual host OS, however, the GPPN is a page number that is then mapped into the physical memory space of the hardware memory as a PPN.

There must be some way for the VM to access hardware devices, albeit in a manner transparent to the VM itself. One solution would of course be to include in the VMM all the required drivers and functionality normally found in the host OS 220 to accomplish I/O tasks. Two disadvantages of this solution are increased VMM complexity and duplicated effort—if a new device is added, then its driver would need to be loaded into both the host OS and the VMM. In systems that include a host OS (as opposed to a dedicated kernel), a different method has been implemented by VMware, Inc., in its Workstation product. This method is also illustrated in FIG. 1.

In the system illustrated in FIG. 1, both the host OS and the VMM are installed at system level, meaning that they both run at the greatest privilege level and can therefore independently modify the state of the hardware processor(s). In FIG. 1, the horizontal line 600 symbolizes the boundary between system-level and user-level processes. For I/O to at least some devices, however, the VMM may issue requests via the host OS 220. To make this possible, a special driver VMdrv 242 is installed as any other driver within the host OS 220 and exposes a standard API to a user-level application VMapp 500. When the system is in the VMM context, meaning that the VMM is taking exceptions, handling interrupts, etc., but the VMM wishes to use the existing I/O facilities of the host OS, the VMM calls the VMdrv, which calls the application VMapp 500, which then issues calls to the host OS, which then carries out the I/O request by calling the appropriate routine in the host OS. The driver VMdrv 242 and application VMapp 500 thus enable the VMM to use features of the host system software even though the VMM is essentially transparent to this host system software.

In FIG. 1, the vertical line 610 symbolizes the boundary between the virtualized (VM/VMM) and non-virtualized (host software) "worlds." A thread can be in only one of the virtualized and host "worlds" at a time. Switching worlds is quite costly, so these two "worlds" can be considered to be separate "domains" in the sense introduced above.

The lines 600, 610 symbolically divide the computer system into four functional quadrants as follows:

|  | Host domain | Virtual domain |
| --- | --- | --- |
| User level: | III | II |
| System level: | IV | I |

Switching domains is typically very costly: Whenever a thread needs to switch from the host domain to the VM/VMM domain, the many data structures and other state information maintained or affected by the host OS must be saved. This includes such host state information as interrupt descriptor table pointers, the instruction pointer, page table pointers, etc. Returning to the host domain involves reversing this costly procedure and saving the state information relating to the VM/VMM. Similarly complicated procedures are typically required to switch domains in other systems. If, as in the prior art, the problems of concurrency are handled using the scheduler 250 and/or a lock (adaptive or not) in the host domain, then a domain switch is required every time a process in the virtual domain needs to access a shared resource.

Unless prevented by some other mechanism, any thread at either level (user or system) may use the composite lock according to the invention. In the context of virtualized computers, however, whether a process is at user-level or system-level is often crucial. The VM 300 (quadrant II), for example, generally does not directly access any system-level component other than the VMM 400, or via the VMM. Consequently, any need for the shared resource on the part of the VM, and thus any call to the lock 700, will be taken care of by the VMM.

Composite, Domain-Crossing Lock

The invention greatly reduces the need for domain-switching during locking by providing a composite, domain-crossing lock. In FIG. 1, the composite lock according to the invention is shown as the software component 700. The composite lock 700 includes a general-purpose "front-end" lock component 702, and a "back-end" lock component 704 that consists of an opaque, host-exported synchronization primitive, which may be available only from one or some domains. One advantage of the front-end lock component is that it can be implemented under designer control using only simple, unprivileged instructions (such as ALU and shared memory operations), and can therefore be platform- and domain-independent.

The back-end component 704 is any conventional semaphore that exports sema_Wait and sema_Signal operations. Note that the semaphore interface can be implemented using many different techniques, including spin and blocking locks, as well as other known synchronization objects. This lock component is referred to below as the "platform lock component" 704. In the preferred embodiment of the invention, the platform lock component is a semaphore, as defined above. As such, the platform lock component 704 allows calls to two functions, namely sema_Wait(S) and sema_Signal(S), which are also explained above. From the point of view of the invention, the platform lock component may be viewed as a "black box" primitive that is provided by the host system software 200, and that operates entirely in the host domain, with any conventional hardware support as needed.

The front-end component of the composite lock according to the invention is shown in FIG. 1 as the unshaded component 702. Note that this lock component 702 must be available in all domains where threads/processes/tasks need to acquire or release the composite lock. In the illustrated embodiment of the invention, the front-end lock component is available in both the host domain and the VMM/VM domain.

Figure 2:
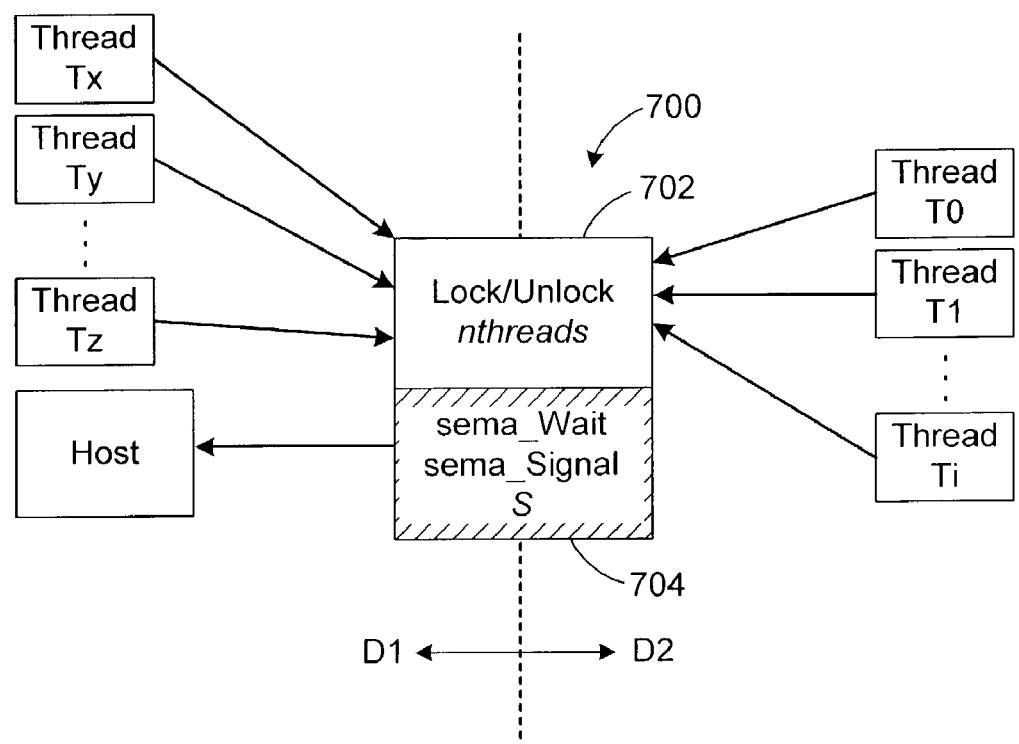
FIG. 2 illustrates several threads operating in different domains, all of whose access to a shared resource is controlled by the domain-crossing composite lock according to the invention.

FIG. 2 illustrates the case in which the composite lock according to the invention is used to control access to a shared resource by several threads, which may be currently in different domains. Thus threads (or processes) Tx, Ty, . . . , Tz are shown in domain D1, whereas threads (or processes) T0, T1, . . . , Ti are shown in a different domain D2. In the illustrated case, D1 is also the host domain.

As FIG. 2 illustrates, all threads that wish to access the shared resource, regardless of which domain they are currently in, interact with the lock through its "front end," that is, through the component 702. As will be made clearer below, the front-end component 702 then calls the back-end component as needed, which in turn involves the host OS. The composite lock according to the invention may therefore be made available to any threads in any domain and level (user vs. system), limited only by the requirements of the designer.

The front-end lock component has two functions that threads may call, namely, Lock(mx) and Unlock(mx). For the sake of illustration, assume the following variable and function names:

nthreads: The number of threads that have acquired a lock or are trying to; in other words, nthreads indicates how many threads have been given access to the critical section (at most one) plus the number that currently want access Atomic_incr(k): A preferably (but not necessarily) hardware-provided atomic function that increments the value of k but that returns the value of k immediately before it is incremented. The preferred implementation of this atomic operation is thus "fetch-and-increment." (Modifications to the front-end lock component code to accommodate returning the post-incrementing value of k will be obvious to skilled programmers.)

Atomic_decr(k): A preferably (but not necessarily) hardware-provided atomic function that decrements the value of k but that returns the value of k immediately before it is decremented. The preferred implementation of this atomic operation is thus "fetch-and-decrement." (As with Atomic_incr(k), modifications to the front-end lock component code to accommodate returning the post-decrementing value of k will be obvious to skilled programmers.)

mx: Short for "mutual exclusion," mx identifies the front-end/back-end pair of the composite lock 700. Note that different locks (according to the invention or otherwise) may be used in the same computer system, for example, to control access to different shared resources. The desired lock must therefore be identified in some manner, such as by a designator such as "mx." Any other parameter(s) may of course be used to identify the front-end lock component 702. In the preferred embodiment of the invention, mx is an object that has two fields—mx.nthreads and mx.S, which contain the values of nthreads and S, respectively.

In the preferred embodiment of the invention, the front-end lock component 702 is a block of computer instructions and related state information that implement the two functions Lock(mx) and Unlock(mx) as defined in the following pseudocode:

Lock(mx)
  if (Atomic_incr(mx.nthreads)>0) then
    sema_Wait(S)
  endif
Unlock(mx)
  if (Atomic_decr(mx.nthreads)>1) then
    sema_Signal(S)
  endif For the embodiment of the invention described here, the tests "if (Atomic_incr(mx.nthreads)>0)" and "if (Atomic_decr(mx.nthreads)>1)" are done using the pre-incremented and pre-decremented values of nthreads, respectively.

Note that the front-end lock component 702 conditionally calls the functions of the platform lock component 704 depending on the value of nthreads. In other words, depending on nthreads, the composite lock according to the invention may need to call into the host domain (to the back-end lock component 704, that is the semaphore) and cause a domain switch, but will not need to do so at all if the lock is uncontested.

One other notable feature of the composite lock according to the invention is its surprising compactness and simplicity: No more than three instructions are required to implement each of the functions Lock and Unlock. Of course, the instructions above are pseudocode, but in actual implementations the corresponding instructions sequences are also very short. This greatly increases the speed of use of the composite lock according to the invention in the uncontested case.

The pseudocode above illustrating the front-end lock component 702 corresponds to the implementation of this component in a prototype of the invention. The amount of incrementing and decrementing (one), whether pre-or post-incremented and decremented values are used, etc., can all be modified by those skilled in the field of concurrent programming to accomplish equivalent Lock and Unlock functions. In general, according to the invention, the Lock and Unlock functions each implement an atomic variable change (which is an operation on memory), such as incrementing and decrementing, respectively, and a decision as to whether to invoke the sema_Wait or sema_Signal operations based on a comparison of the variable's value against a predetermined threshold value or condition. In the example given above, the variable is nthreads, and it is changed (incremented or decremented) atomically by the fixed amount one. The threshold value is zero for the Lock operation and one for the Unlock operation. Invocation of sema_Wait and sema_Signal is required only once per Lock/Unlock operation pair.

The state of the lock 700 may be represented by the pair (S,nthreads) of parameters that indicate the state of each lock component 702, 704. Thus, S represents the platform lock component 704 (semaphore S) and nthreads represents the front-end lock component 702. The composite lock is initialized to S=0 and nthreads=0. (Note that this differs from the conventional S=1 initialization of a semaphore.) The initial state is also the "resting state" of the lock in that it indicates that no process is in its critical section or is currently suspended, waiting to enter it.

The way in which the composite lock according to the invention is included in instruction sequences is as a bracketing protocol before and after a critical section. As will be understood from the examples below, this ensures that only one process will hold the lock (be allowed to access the shared resource, such as a critical code section) at any one time. Thus, any process wishing to access the shared resource should acquire and release the lock 700 as follows:

Lock(mx)
critical section
Unlock(mx)

Both the Lock and Unlock operations may be "contested": A contested Lock operation is an attempt to acquire a lock at a point in time when another thread holds the lock. A contested Unlock operation is the release of a lock when another thread has performed the atomic increment of nthreads towards acquiring the lock.

To understand how the composite lock according to the invention works, assume that several concurrent threads (processes) T0, T1, . . . , Ti wish to access a shared resource (by way of example, a critical section) and that access to the resource is granted via the lock 700. Regardless of the number of processes that share the resource, one of three situations may occur:

1) Uncontested access—a first thread acquires the lock with no other thread attempting to do so at them same time.

2) Non-interleaved contention—at least one other thread calls Lock and proceeds into sema_Wait before the first thread has begun to release the lock.

3) Interleaved contention—at least one other thread attempts to acquire the lock (with a Lock call) before the first thread has released it (with an Unlock call), but execution of the instructions comprising the Lock function is interleaved with execution of the instructions comprising the Unlock function.

Uncontested Access

Assume a single thread T0 needs to hold the lock. The state of the lock (S,nthreads) immediately after completion of each T0 action will be as shown in Table 1, in which instr stands for arbitrary, non-critical code and critical section is arbitrary code that requires exclusive access to the shared resource.

Note that although nthreads is incremented atomically to nthreads=1 in order for T0 to acquire the lock, it is not necessary to call the sema_Wait(S) function of the platform lock component 704. In other words, for uncontested lock acquisition, it is not necessary to invoke the host-domain platform lock component at all. This alone will typically provide a significant improvement in performance over prior art synchronization mechanisms. Once the process has finished its critical section, it calls Unlock and proceeds with non-critical processing. The lock is then once again in its initial, resting state.

Non-Interleaved Contention

Assume now that another thread T1 attempts to acquire Lock(mx) while T0 holds it. This situation would proceed as outlined in Table 2 below. In some rows of Table 2 actions are for both T0 and T1. This is not meant to imply that these actions are necessarily being executed simultaneously, although this would be possible in a parallel processing environment; rather, this indicates that concurrent processing of the different actions does not affect the state of the lock or lead to any conflict. This convention is also used in Table 3 below.

The state changes shown in Table 2 will be the same for any number of threads attempting to access the lock—nthreads will simply continue to increment to indicate how many threads currently either hold the lock (one thread) plus those that wish to (and are suspended or soon will be). S will remain equal to zero. The only issue will be which thread to awaken when the thread currently holding the lock releases it; this decision will be made preferably by the host scheduler 250.

Interleaved Contention

The non-atomicity of the Lock(mx) and Unlock(mx) functions causes the problem that certain interleavings of different instruction threads could lead to a race and thus a failure to meet one or more of the requirements outlined by Ben-Ari (mutual exclusion; no deadlocking; no starvation; and success in absence of contention).

Because the Lock(mx) and Unlock(mx) functions are so compact, only a few potentially disruptive interleavings are possible. One such interleaving is analyzed in Table 3 below; others may be analyzed in the same manner to show that the composite lock according to the invention handles all such interleavings correctly, without a race.

In Table 3 it is assumed that a second thread T1 begins execution of the Lock(mx) function after the first thread T0 has completed execution of Lock(mx) (and thus holds the lock), but that T0 also completes execution of the Unlock (mx) call before T1 can get to the sema_Wait(S) call embedded in Lock(mx). In other words, T0's Unlock(mx) call is completed between the "if (Atomic_incr(mx-.nthreads)>0)" and "sema_Wait(S)" instructions of T1's Lock(mx) execution sequence.

The important event to consider occurs at State 4: Thread T0 completes its Unlock call before T1 executes the sema_Wait(S) part of its own Lock call. Because no thread will have been suspended when T0 calls sema_Signal(S), S will be set to 1. T0, now finished with the lock, will then proceed with other non-critical processing and T1 will be free to proceed to complete its Lock call by calling sema_Wait(S). This time, however, because S=1, T1 will not be suspended, but rather S will be reset to 0; T1 will be free to enter its critical section and, when finished, release the lock by calling Unlock.

By working through the definitions of the functions Lock, Unlock, sema_Wait and sema_Signal, and noting the different states of the lock (S,nthreads), one can establish the correctness of the composite lock according to the invention even in the case of interleaved contention involving more than two concurrent threads. One can also satisfy oneself that this is true by considering the following: Assume multi-thread interleaving. When the thread that currently holds the lock calls Unlock, then either at least one other thread is currently suspended, or none is. Each suspended thread will be awakened in turn by a previously awakened thread, until no threads remain suspended.

If nthreads is still >1 at this point, then at least one other non-suspended thread has not yet reached the sema_Wait(S) part of its Lock call. Each such thread will be allowed to proceed in turn because, when it does reach its sema_Wait (S) call, S will be =1 and that thread will avoid suspension.

This will continue until all such non-suspended but interleaved threads complete their sema_Wait(S) calls, one by one, until none remain. At this point, the lock will return to its resting state (S,nthreads)=(0,0).

Note that, regardless of whether the lock is contested, and regardless of interleavings, the semaphore S will take only one of two values, that is, either S=0 or S=1: The composite lock according to the invention never needs or attempts to increment the semaphore S if the value of S is already strictly greater than zero. Consequently, the composite lock according to the invention will work equally well whether the back-end lock component 704 is a binary or a counting semaphore, because it will never try to push the semaphore, regardless of its type, to a value where the two types of semaphores differ.

As is mentioned above, uncontested Lock and Unlock operations do not involve the platform lock component 704. This brings out another advantage of the invention, namely, that the lock according to the invention can, in the absence of contention, partially compensate for a poor (slow) design of the platform lock component because in this case the platform lock component can be avoided altogether.

As mentioned above, the simplicity, compactness, and therefore speed of the front-end lock component 702 according to the invention are significant advantages. The advantage increases with increasing complexity of domain switching, such as between the virtual and host domains in a virtualized computer system as shown in FIG. 1. It would be possible, however, and still within the scope of this invention, to add other features to the front-end lock component 702, although this will of course increase the complexity of the lock. For example, the front-end lock component 702 itself could be implemented so as to be adaptive: After some maximum number (predetermined, heuristic, or adaptive) of failed attempts on the part of a thread to get the lock, and/or after some time, a domain switch to the platform lock component's domain could be forced.

Spin-Enhanced Embodiment of the Invention

The front-end lock component 702 may, accordingly, be implemented to provide for at least temporary, conditional spinning. One example of an implementation of this possibility will now be described. First, however, some additional background information is provided.

Let TryLock( ) be an operation that attempts to acquire a lock. If the lock is available, the effect is exactly the same as that of the Lock function: the calling thread is allowed to hold the lock. If the lock is not available (that is, the regular Lock( ) operation would be contested), the thread does not obtain the lock; nor does it wait to acquire it. TryLock( ) usually returns a Boolean value to the calling thread to indicate whether the lock was acquired or not.

As is mentioned above, in single-domain systems, it is well-known (to those skilled in the art) that spinning and blocking can be combined in an adaptive lock implementation to provide a higher-performance lock than what either the spinning or blocking approach alone could provide. Allowing the Lock(mx) operation to perform a short spin that either leads to acquiring the lock or is followed by a blocking wait will therefore often increase the overall efficiency of the system by reducing the number of block and unblock operations. The TryLock( ) is a useful operation both to provide for general purpose programming with locks and to use when building an adaptive spinning/blocking lock.

The TryLock( ) operation may also be tailored for use in a multi-domain system such as the invention. This will provide a benefit similar to that of an adaptive, spinning/blocking lock, but instead of reducing the number of blocking operations on contested locks, it reduces the number of domain crossings for the composite lock according to the invention while contention is present.

The TryLock( ) operation for the composite lock 700 according to the invention makes use of a compare-and-swap (CAS) operation, which is a well-known atomic instruction providing the following functionality:

CAS(v, old, new):
if (v==old) then
    v=new
    return old
endif
return v

The CAS operation therefore determines if the variable v contains the value "old." If it does, then it (atomically) sets v to "new" and returns the original value of v, i.e., "old." On the other hand, if v has a different value, it will return this value.

For this embodiment of the invention, the TryLock(mx) operation invokes CAS( ) as follows:

CAS(mx.nthreads, 0, 1)

This means that an attempt is made to change the value of nthreads from zero to one (atomically), but if this attempt fails (that is, the incoming value of nthreads is not zero), then nothing is changed. In either case, the result of CAS( ) is the original value of nthreads, which is then compared against zero to determine if the CAS( ) operation succeeded or did nothing. With this use of CAS( ) one can thus implement TryLock( ) on the composite lock according to the invention as follows:

TryLock(mx):
return CAS(mx.nthreads, 0, 1)==0

If the value of nthreads was zero, this code sets it to one and returns the Boolean value True to the caller to indicate that TryLock succeeded in acquiring the lock. Note that the state change in the lock is exactly the same as would result from invoking Lock(mx) on an uncontested lock: mx.nthreads changes from zero to one, and mx.S is unaffected. On the other hand, if the CAS( ) operation fails, then TryLock( ) will return False and the state of the composite lock is unmodified.

It is now possible to demonstrate how spinning in the front-end lock component 702 can reduce the number of costly domain crossings. The back-end platform lock component 704 may spin or not—since it is a platform-provided abstraction it may remain a "black box."

Recall that domain crossing results from contested Lock( ) and Unlock( ) operations: In these cases, the acting thread performs the Atomic_incr or Atomic_decr operations on nthreads and determines whether it is necessary to cross to the other domain to complete the operation on the platform component, that is the semaphore S. By adding a spin phase to the front-end operation, it will often be possible to avoid a domain crossing when the lock is momentarily unavailable. The thread trying to acquire the composite lock will notice in the front-end code that it is unavailable, but instead of immediately causing the expensive domain crossing (the sema_Wait function call) to issue a blocking operation on the back-end, it first spins for a bounded time. If the lock becomes available while the thread is spinning, then the thread will avoid the domain crossing. Moreover, the thread that held the lock will also avoid a domain crossing in the release path (the sema_Signal function call).

The following pseudo-code shows how spinning is added to the basic composite lock to obtain this spin-enhanced embodiment of the composite lock according to the invention:

```
Lock(mx):
    int i = spinLimit      /* How long can spinning last? */
    while (i > 0)
        if (TryLock(mx)) then
            return         /* Lock was acquired without blocking. */
        endif
        i = i-1            /* Spin until i reaches zero. */
    endwhile
    if (Atomic_incr(mx.nthreads) > 0) then
        sema_Wait(mx.S)
    endif
No changes are necessary in the Unlock( ) operation.
```

In the spin-enhanced version of the composite lock, TryLock( ) is repeatedly invoked inside the "while" loop. If TryLock succeeds, there is an immediate return because the lock has been acquired. If TryLock fails, a counter (i) is decremented and TryLock is retried, until the counter reaches zero. At that point, the lock's state has not been disturbed by this thread (since a failed TryLock( ) invocation does not change the state of the composite lock), so execution may simply proceed into the protocol for acquiring the composite lock: incrementing nthreads and proceeding with the domain crossing and blocking via the back-end platform lock component if the result indicates failure to acquire the lock.

If the composite lock is unavailable for a short period only, then chances are good that the spinning thread will be able to acquire it with one of the TryLock( ) invocations, thereby, once again, avoiding the costly domain crossing. Additionally, because the acquiring thread will not proceed with the incrementing operation right away, the releasing thread has a higher chance of finding "nthreads" equal to one, which means that it can release the lock without performing any domain crossing.

TABLE 1

| State | T0 action | S | nthreads | Comments |
|---|---|---|---|---|
| 0 | instr | 0 | 0 | Initial state |
| 1 | if(Atomic_incr(mx.nthreads)>0) | 0 | 1 | T0 now holds lock |
| 2 | critical section | 0 | 1 | |
| 3 | if(Atomic_decr(mx.nthreads)>1) | 0 | 0 | T0 releases lock, which returns to resting state |
| 4 | instr | 0 | 0 | |

TABLE 2

| State | T0 action | T1 action | S | nthreads | Comments |
|---|---|---|---|---|---|
| 0 | instr | instr | 0 | 0 | Initial state |
| 1 | if(Atomic_incr(mx.nthreads)>0) | " | 0 | 1 | T0 now holds lock |
| 2 | critical section | if(Atomic_incr(mx.nthreads)>0) | 0 | 2 | T1 tries to get lock |
| 3 | " | sema_Wait(S) | 0 | 2 | |
| 4 | " | Suspended | 0 | 2 | |
| 5 | if(Atomic_decr(mx.nthreads)>1) | " | 0 | 1 | T0 releases lock |
| 6 | sema_Signal(S) | Awakened | 0 | 1 | T1 now holds lock |
| 7 | instr | critical section | 0 | 1 | |
| 8 | " | if(Atomic_decr(mx.nthreads)>0) | 0 | 0 | T1 releases lock, which returns to resting state |
| 9 | " | instr | 0 | 0 | |

TABLE 3

| State | T0 action | T1 action | S | nthreads | Comments |
|---|---|---|---|---|---|
| 0 | instr | instr | 0 | 0 | Initial state |
| 1 | if(Atomic_incr(mx.nthreads)>0) | " | 0 | 1 | T0 now holds lock |
| 2 | critical section | if(Atomic_incr(mx.nthreads)>0) | 0 | 2 | T1 executes first part of Lock |
| 3 | if(Atomic_decr(mx.nthreads)>1) | | 0 | 1 | T0 executes first part of Unlock |
| 4 | sema_Signal(S) | | 1 | 1 | T0 Unlock call completes but T1 is not suspended |
| 5 | instr | sema_Wait(S) | 0 | 1 | S = 1 upon call to sema_Wait(S) |
| 6 | " | critical section | 0 | 1 | |
| 7 | " | if(Atomic_decr(mx.nthreads)>1) | 0 | 0 | Lock back to resting state |
| 8 | " | instr | 0 | 0 | |

We claim:

1. In a computer system that has a hardware platform, a software platform and a plurality of processes running in user-defined domains, a lock comprising:
   A) a platform-dependent lock component that operates as a semaphore with a wait function and a signal function;
   B) a front-end lock component comprising computer instructions
      i) for acquiring the lock by performing a first operation on a variable, which indicates how many of the processes currently hold or wish to acquire the lock, a) by atomically changing the variable by a first predetermined amount as part of the first operation; and
b) by calling the wait function of the platform-dependent lock component if the variable meets a first comparison condition relative to a predetermined first threshold value,
ii) for releasing the lock by performing a second operation on the variable
a) by atomically changing the variable by a second predetermined amount as part of the second operation; and
b) by calling the signal function of the platform-dependent lock component if the variable meets a second comparison condition relative to a predetermined second threshold value;
C) the processes calling the front-end lock component in order to acquire the lock regardless of the domain in which each process is currently executing;
D) the platform-dependent lock component and the front-end lock component being accessible from different domains;
E) only one of the processes at a time thereby being allowed to acquire the lock.

2. A lock as in claim 1, in which the first operation is fetch-and-increment.

3. A lock as in claim 1, in which the second operation is fetch-and-decrement.

4. A lock as in claim 1, in which the first operation is fetch-and-increment and the second operation is fetch-and-decrement.

5. A lock as in claim 1, in which the first comparison condition is that the variable indicates that at least one of the processes currently holds or wishes to acquire the lock.

6. A lock as in claim 1, in which the second comparison condition is that the variable indicates that at least one of the processes wishes to acquire the lock in addition to the process that currently holds the lock.

7. A lock as in claim 1, in which the front-end lock component comprises further computer instructions for testing, when a calling process requests the lock and for a finite number of iterations, whether any process currently holds the lock and,
if not, for giving the lock to the calling process and
if so, at the end of the finite number of iterations, for proceeding with atomically changing the variable and calling the wait function.

8. A lock as in claim 1, in which the lock is interposed between the processes and a resource for providing exclusive access to the resource to whichever process holds the lock.

9. In a computer system that has a hardware platform, a software platform, a resource and a plurality of user-defined domains, a lock for controlling access to the resource by a plurality of processes, the lock comprising:
A) a platform-dependent lock component that operates as a semaphore with a wait function and a signal function;
B) a front-end lock component comprising computer instructions
i) for acquiring the lock and granting access to the resource by performing a fetch-and-increment operation on a variable, which indicates how many of the processes currently hold or wish to acquire the lock,
a) by atomically changing the variable by a first predetermined amount as part of the first operation; and
b) by calling the wait function of the platform-dependent lock component if the variable meets a first comparison condition relative to a predetermined first threshold value,
ii) for releasing the lock by performing a fetch-and-decrement operation on the variable
a) by atomically changing the variable by a second predetermined amount as part of the second operation; and
b) by calling the signal function of the platform-dependent lock component if the variable meets a second comparison condition relative to a predetermined second threshold value;
C) the processes calling the front-end lock component in order to acquire the lock and access the resource regardless of the current domain in which each process is currently executing;
D) the platform-dependent lock component and the front-end lock component being accessible from different domains;
E) only one of the processes at a time thereby being allowed to hold the lock;
in which:
F) the first comparison condition is that the variable indicates that at least one of the processes currently holds or wishes to acquire the lock; and
G) the second comparison condition is that the variable indicates that at least one of the processes wishes to acquire the lock in addition to the process that currently holds the lock.

10. A computer system comprising:
a host hardware platform;
host software that includes a platform-provided lock component;
a virtual machine (VM);
a virtual machine monitor that forms a software interface between the VM and the host hardware platform;
a plurality of user-defined domains including a host domain and a VM domain;
a composite lock that has a front-end component that is accessible to processes running in both the host domain and the VM domain and that conditionally calls the platform-provided lock component in the case of contention for the composite lock.

11. A computer system as in claim 10, in which:
the platform-provided lock component operates as a semaphore with a wait function and a signal function;
the front-end lock component comprises computer instructions
i) for calling the wait function of the platform-provided lock component if a first condition is met;
ii) for calling the signal function of the platform-provided lock component if a second condition is met;
the processes call the front-end lock component to acquire the lock regardless of the current domain in which each process is currently executing;
only one of the processes at a time thereby being allowed to hold the lock.

12. A computer system as in claim 11, in which:
the first condition is that any of the processes currently holds the lock;
the second condition is that at least one of the processes has attempted to acquire the lock and is still currently waiting to acquire the lock;

in the absence of contention for the lock, calls into the platform-provided lock component and corresponding switching of domains thereby being avoided.

13. A computer system as in claim 12, in which the front-end lock component further comprises computer instructions
   i) for acquiring the lock by performing a first operation on a variable, which indicates how many of the processes currently hold or wish to acquire the lock and access the resource,
      a) by atomically changing the variable by a first predetermined amount as part of the first operation; and
      b) by calling the wait function of the platform-provided lock component if the variable meets a first condition relative to a predetermined first threshold value,
   ii) for releasing the lock by performing a second operation on the variable
      a) by atomically changing the variable by a second predetermined amount as part of the second operation; and
      b) by calling the signal function of the platform-provided lock component if the variable meets a second condition relative to a predetermined second threshold value.

14. A computer system as in claim 13, in which the first operation is fetch-and-increment.

15. A computer system as in claim 13, in which the second operation is fetch-and-decrement.

16. A computer system as in claim 13, in which the first operation is fetch-and-increment and the second operation is fetch-and-decrement.

17. A computer system as in claim 13, in which the first condition is that the variable indicates that at least one of the processes currently holds or wishes to acquire the lock.

18. A computer system as in claim 13, in which the second condition is that the variable indicates that at least one of the processes wishes to acquire the lock in addition to the process that currently holds the lock and has access to the resource.

19. A computer system as in claim 13, in which the front-end lock component comprises further computer instructions for testing, when a calling process requests the lock and for a finite number of iterations, whether any process currently holds the lock and,
   if not, for giving the lock to the calling process and
   if so, at the end of the finite number of iterations, for proceeding with the steps of atomically changing the variable and calling the wait function.

20. A computer system as in claim 10, in which the lock is interposed between the processes and a resource for providing exclusive access to the resource to whichever process holds the lock.

21. In a computer system that has a hardware platform, a software platform and a plurality of user-defined domains, a method for controlling concurrently running processes comprising:
   A) running as a semaphore a platform-dependent lock component with a wait function and a signal function;
   B) running a front-end lock component to include the following sub-steps:
      i) acquiring the lock by performing a first operation on a variable, which indicates how many of the processes currently hold or wish to acquire the lock,
         a) by atomically changing the variable by a first predetermined amount as part of the first operation; and
         b) by calling the wait function of the platform-dependent lock component if the variable meets a first comparison condition relative to a predetermined first threshold value,
      ii) releasing the lock by performing a second operation on the variable
         a) by atomically changing the variable by a second predetermined amount as part of the second operation; and
         b) by calling the signal function of the platform-dependent lock component if the variable meets a second comparison condition relative to a predetermined second threshold value;
   C) processes calling the front-end lock component in order to access the resource regardless of the current domain in which each process is currently executing;
   D) the platform-dependent lock component and the front-end lock component being accessible from different domains;
   E) thereby allowing only one of the processes at a time to acquire the lock.

22. A method as in claim 21, in which the first operation is fetch-and-increment.

23. A method as in claim 21, in which the second operation is fetch-and-decrement.

24. A method as in claim 21, in which the first operation is fetch-and-increment and the second operation is fetch-and-decrement.

25. A method as in claim 21, in which the first comparison condition is that the variable indicates that at least one of the processes currently holds or wishes to acquire the lock.

26. A method as in claim 21, in which the second comparison condition is that the variable indicates that at least one of the processes wishes to acquire the lock in addition to the process that currently holds the lock.

27. A method as in claim 21, further comprising, when a calling process requests the lock and for a finite number of iterations, testing, in the front-end lock component, whether any process currently holds the lock and, if not, giving the lock to the calling process and if so, at the end of the finite number of iterations, proceeding with the steps of atomically changing the variable and calling the wait function.

28. A method as in claim 21, further comprising interposing the lock between the processes and a resource for providing exclusive access to the resource to whichever process holds the lock.

29. In a computer system that has a hardware platform, a software platform and a plurality of user-defined domains, a method for controlling concurrently running processes comprising:
   A) running as a semaphore a platform-dependent lock component with a wait function and a signal function;
   B) running a front-end lock component to include the following sub-steps:
      i) acquiring the lock by performing a fetch-and-increment operation on a variable, which indicates how many of the processes currently hold or wish to acquire the lock,
         a) by atomically changing the variable by a first predetermined amount as part of the first operation; and
         b) by calling the wait function of the platform-dependent lock component if the variable meets a first comparison condition relative to a predetermined first threshold value, in which the first comparison condition is that the variable indicates that at least one of the processes currently holds or wishes to acquire the lock;

ii) releasing the lock by performing a fetch-and-decrement operation on the variable
  a) by atomically changing the variable by a second predetermined amount as part of the second operation; and
  b) by calling the signal function of the platform-dependent lock component if the variable meets a second comparison condition relative to a predetermined second threshold value, in which the second comparison condition is that the variable indicates that at least one of the processes wishes to acquire the lock in addition to the process that currently holds the lock;

C) processes calling the front-end lock component in order to access the resource regardless of the current domain in which each process is currently executing;

D) the platform-dependent lock component and the front-end lock component being accessible from different domains;

E) thereby allowing only one of the processes at a time to acquire the lock.

30. In a computer system that has a host hardware platform, a host software platform, a virtual machine monitor running on the hardware platform, and a virtual machine (VM) running on the virtual machine monitor, a method for controlling concurrently running processes comprising:

defining a plurality of domains, including a host domain and a VM domain; and running a composite lock that has a front-end component that is accessible to processes running in both the host domain and the VM domain and that conditionally calls a platform-provided lock component in the case of contention for the composite lock.

31. A method as in claim 30, further comprising:

running as a semaphore a platform-dependent lock component with a wait function and a signal function;

running a front-end lock component according to the following sub-steps:
  i) calling the wait function of the platform-provided lock component if a first condition is met;
  ii) calling the signal function of the platform-provided lock component if a second condition is met;

the processes calling the front-end lock component to acquire the lock regardless of the domain in which each process is currently executing;

thereby allowing only one of the processes at a time to acquire the lock.

32. A method as in claim 31, in which:

the first condition is that any of the processes currently holds the lock;

the second condition is that at least one of the processes has attempted to acquire the lock and is still currently waiting to acquire the lock;

in the absence of contention for the lock, calls into the platform-provided lock component and corresponding switching of domains thereby being avoided.

33. A method as in claim 32, further comprising, in the front-end lock component:

i) acquiring the lock by performing a first operation on a variable, which indicates how many of the processes currently hold or wish to acquire the lock and access the resource,
  a) by atomically changing the variable by a first predetermined amount as part of the first operation; and
  b) by calling the wait function of the platform-provided lock component if the variable meets a first condition relative to a predetermined first threshold value, ii) releasing the lock by performing a second operation on the variable
  a) by atomically changing the variable by a second predetermined amount as part of the second operation; and
  b) by calling the signal function of the platform-provided lock component if the variable meets a second condition relative to a predetermined second threshold value.

34. A method as in claim 33, in which the first operation is fetch-and-increment.

35. A method as in claim 33, in which the second operation is fetch-and-decrement.

36. A method as in claim 33, in which the first operation is fetch-and-increment and the second operation is fetch-and-decrement.

37. A method as in claim 33, in which the first condition is that the variable indicates that at least one of the processes currently holds or wishes to acquire the lock.

38. A computer system as in claim 33, in which the second condition is that the variable indicates that at least one of the processes wishes to acquire the lock and in addition to the process that currently holds the lock and has access to the resource.

39. A method as in claim 30, further comprising, when a calling process requests the lock and for a finite number of iterations, testing, in the front-end lock component, whether any process currently holds the lock and, if not, giving the lock to the calling process and if so, at the end of the finite number of iterations, proceeding with the steps of atomically changing the variable and calling the wait function.

40. A method as in claim 30, further comprising interposing the lock between the processes and a resource for providing exclusive access to the resource to whichever process holds the lock.

* * * * *

UNITED STATES PATENT AND TRADEMARK OFFICE
CERTIFICATE OF CORRECTION

PATENT NO. : 7,117,481 B1
APPLICATION NO. : 10/289728
DATED : October 3, 2006
INVENTOR(S) : Ole Agesen and Keith M. Adams It is certified that error appears in the above-identified patent and that said Letters Patent is hereby corrected as shown below:

On the Title page item (73) Assignee, change

"VMWare, Inc., Palo Alto, CA (US)"

to

--VMware, Inc., Palo Alto, CA (US)--

Signed and Sealed this

Twenty-ninth Day of September, 2009

David J. Kappos
*Director of the United States Patent and Trademark Office*